US005126715A

United States Patent [19]

Yerman et al.

[11] Patent Number: 5,126,715

[45] Date of Patent: Jun. 30, 1992

[54] LOW-PROFILE MULTI-POLE CONDUCTIVE FILM TRANSFORMER

[75] Inventors: Alexander J. Yerman, Scotia; Waseem A. Roshen, Clifton Park, both of N.Y.

[73] Assignee: General Electric Company, Schenectady, N.Y.

[21] Appl. No.: 548,461

[22] Filed: Jul. 2, 1990

[51] Int. Cl.[5] .......... H01G 27/28

[52] U.S. Cl. .......... 336/183; 336/200; 336/223; 336/232; 336/233

[58] Field of Search .......... 336/183, 232, 200, 223, 336/206, 233; 361/402

[56] References Cited

U.S. PATENT DOCUMENTS

| | | | |
|---|---|---|---|
| 2,921,165 | 1/1960 | Clarke | 336/223 X |
| 3,002,260 | 10/1961 | Shortt et al. | 336/200 X |
| 3,483,499 | 12/1969 | Lugten | 336/183 X |
| 3,495,327 | 2/1970 | Eisler | 336/223 X |
| 4,342,143 | 8/1982 | Jennings | 361/402 X |
| 4,641,114 | 2/1987 | Person | 336/232 X |
| 4,803,453 | 2/1989 | Tomono et al. | 336/200 X |
| 4,862,129 | 8/1989 | Roshen et al. | 336/61 |
| 4,959,630 | 9/1990 | Yerman et al. | 336/83 |

FOREIGN PATENT DOCUMENTS

| | | | |
|---|---|---|---|
| 58-140104 | 8/1983 | Japan | 336/200 |

OTHER PUBLICATIONS

IBM Technical Disclosure Bulletin, "Printed Circuit Coil", B. W. Styles, vol. 15, No. 1, Jun. 1972, p. 19.

*Primary Examiner*—Thomas J. Kozma
*Attorney, Agent, or Firm*—Jill M. Breedlove; James C. Davis, Jr.; Marvin Snyder

[57] ABSTRACT

A folded conductive film winding transformer provides a plurality of poles and enables increased turns ratios or power handling capacity in structures which must meet severe height limitations.

21 Claims, 15 Drawing Sheets

SECONDARY
STYLE A

SECONDARY
STYLE B

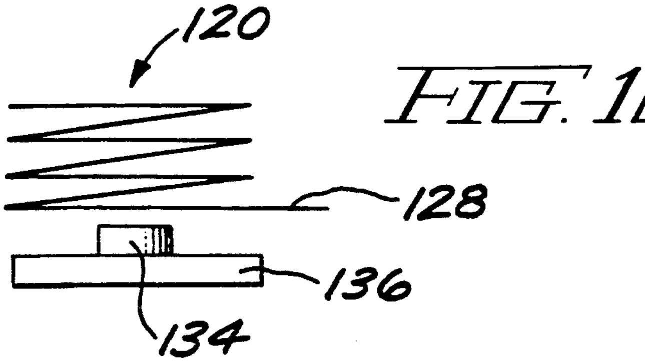
FIG. 16
FIG. 17
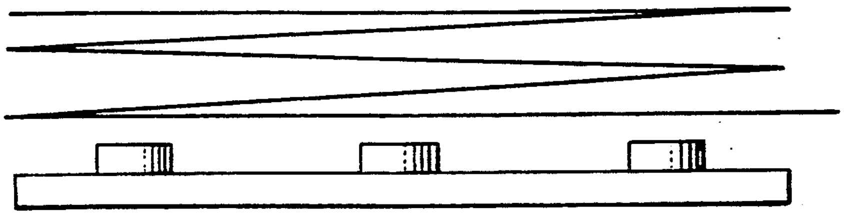
FIG. 18
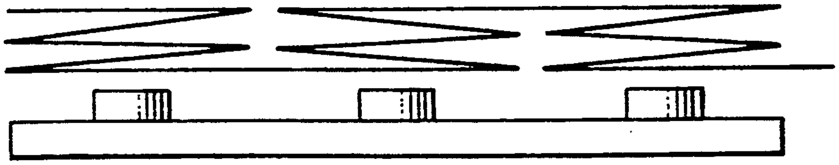

LOW-PROFILE MULTI-POLE CONDUCTIVE FILM TRANSFORMER

RELATED APPLICATIONS

The present application is related to application Ser. No. 07/359,063, filed May 30, 1989 now U.S. Pat. No. 5,017,902, entitled, "Conductive Film Magnetic Components" by A. J. Yerman et al.; application Ser. No. 07/390,036, filed Aug. 7, 1989, now U.S. Pat. No. 4,959,630, issued Sep. 25, 1990, entitled, "High Frequency Transformer" by A. J. Yerman et al. and application Ser. No. 07/548,468 filed Jul. 2, 1990, entitled, "Barrel-Wound Conductive Film Transformer" by A. J. Yerman and U.S. Pat. No. 4,862,129, entitled, "Single-Turn Primary and Single-Turn Secondary Flat Voltage Transformer" by W. A. Roshen, et al., each of which is incorporated herein by reference in its entirety.

FIELD OF THE INVENTION

The present invention relates to the field of magnetic components, and more particularly, to the field of conductive film magnetic components.

BACKGROUND INFORMATION

The related "Conductive Film Magnetic Components" patent application discloses magnetic components having windings comprised of a continuous conductive film which has a serpentine configuration when disposed in a plane and which is folded upon itself to form a plurality of layers providing a current path which encircles a magnetic pole of the structure. Also disclosed therein are secondary windings interleaved with the layers of the continuous film winding to provide a transformer. The conductive film secondary windings may comprise a plurality of separate conductive films connected in parallel to provide a low resistance, high current capacity secondary winding. Such structures are particularly useful for step down transformers because they provide primary and secondary windings having substantially equal power handling capacities at high frequencies.

There are a number of applications for magnetic components which severely restrict the physical dimensions of the magnetic component. One such application is the standard electronic module (SEM) whose physical dimensions are specified by U.S. Government military standards. In particular, in order that circuit cards populated with SEM modules will fit in the electrical interconnection and conductive cooling cages which are standard for such systems, SEM modules are limited to 0.3 to 0.6 inches in thickness perpendicular to the major surface of the module.

Because of increasing system clock frequencies and decreasing power supply voltages, it is considered desirable to install small power supplies in a distributed manner on SEM's in order to minimize electrical noise and maximize voltage regulation. It is apparent from the physical dimension limitations of SEM modules that such distributed power supplies must meet tight specifications on the height of the components therein while also providing high efficiency. Transformers of the type disclosed in the related patent applications meet the current carrying capacity and power density requirements for such systems since they are capable of providing power densities on the order of 400 watts per cubic inch with good efficiency. However, when power levels exceed 50 watts or transformer ratios exceed about 10:1, the height of such transformers exceed the allowable values for the SEM module.

Consequently, there is a need for transformers of this general type which exhibit a reduced height for power levels in excess of 50 watts and transformer turns ratios in excess of 10:1.

OBJECTS OF THE INVENTION

Accordingly, a primary object of the present invention is to provide an improved transformer of the folded conductive film type which exhibits increased power handling capacity while exhibiting a low profile.

Another object of the present invention is to provide a folded conductive film transformer exhibiting a turns ratio in excess of 10:1 while still providing a low profile.

Another object of the present invention is to provide a multi-pole folded conductive film transformer.

Another object of the present invention is to provide a folded conductive film transformer with easily connected secondary windings.

SUMMARY OF THE INVENTION

The above and other objects which will become apparent from the specification as a hole, including the drawings, are achieved in accordance with the present invention by providing a folded conductive film magnetic component having a plurality of poles.

In accordance with one embodiment of the present invention, a continuous serpentine conductive film is configured and folded to provide a single multi-layer folded winding stack having four magnetic poles which are coincident with posts of a ferrite magnetic core in which the winding is disposed for use. Where the component is a transformer, conductive film layers of a secondary winding are interleaved with the layers of the primary winding.

The secondary windings may have external connections on two or more sides of a rectangular winding stack, as may be preferred.

In accordance with another embodiment of the invention, the continuous primary winding film may be configured as a plurality of connected stacks of layers.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 16 and 17 are side view illustrations of the manner of folding a primary winding to provide two and six magnetic poles, respectively, in a single stack; and FIG. 18 is a side view illustration of a manner of folding a primary winding to provide six magnetic poles in three stacks.

DETAILED DESCRIPTION

The present invention is an improvement on the inventions disclosed in the related, incorporated by reference "Conductive Film Magnetic Components" and "High Frequency Transformer" patent applications and U.S. Pat. No. 4,862,129 cited above. As such, the reader who is unfamiliar with such transformers is referred to those applications and that patent for a fuller discussion of that type of transformer, including its fabrication and assembly.

Figure 1:
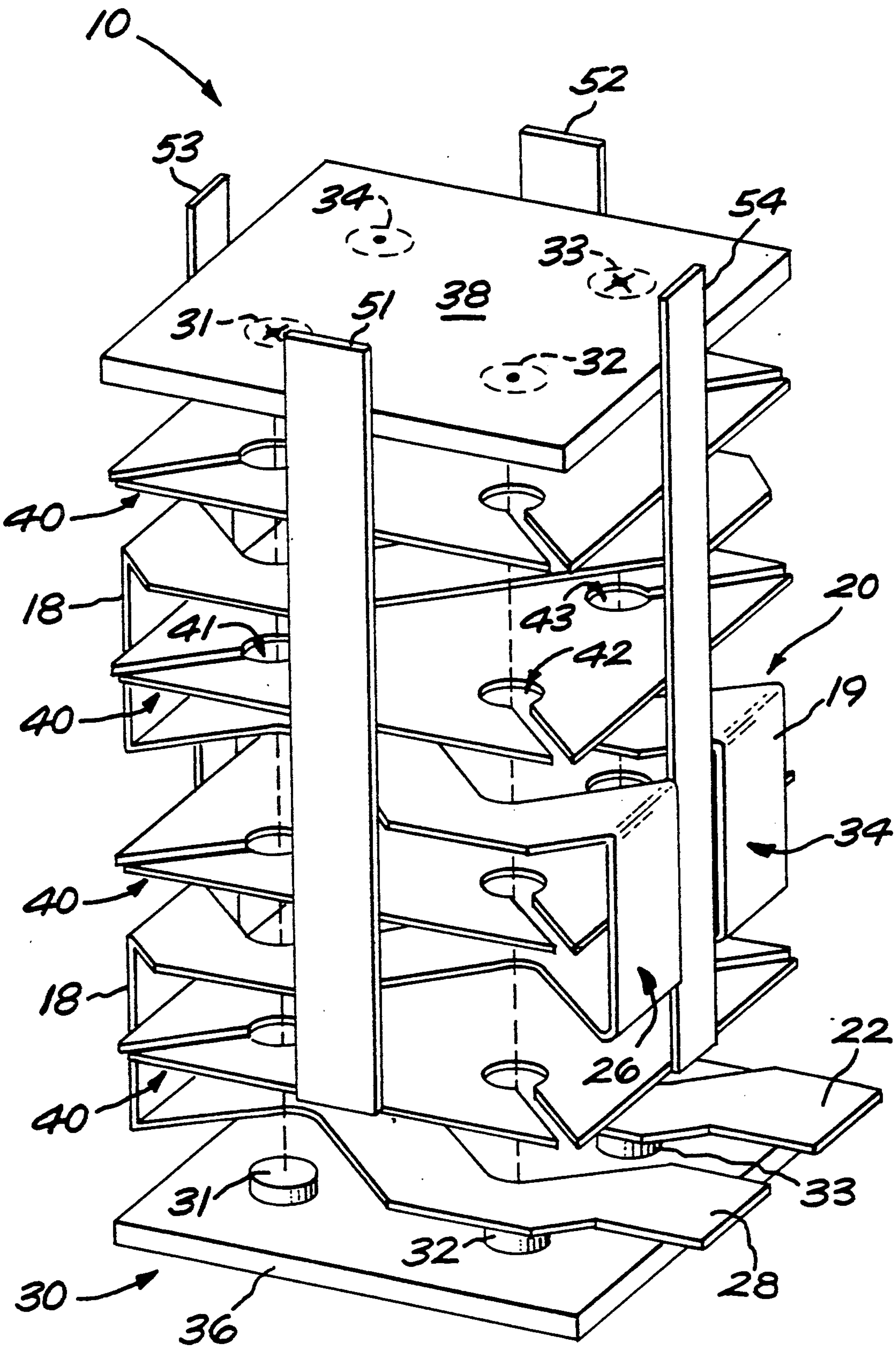
FIG. 1 is a perspective, exploded view of a transformer in accordance with the present invention.

In FIG. 1, a transformer 10 in accordance with the present invention is illustrated in an exploded, schematic view. Included in the transformer 10 is a primary winding 20 of the type which is illustrated in plan view in FIG. 2 in its planar, prior-to-being-folded configuration. Interleaved with the layers of the folded primary winding are conductive film secondary windings 40 of the type illustrated in plan view in FIG. 3.

Figure 2:
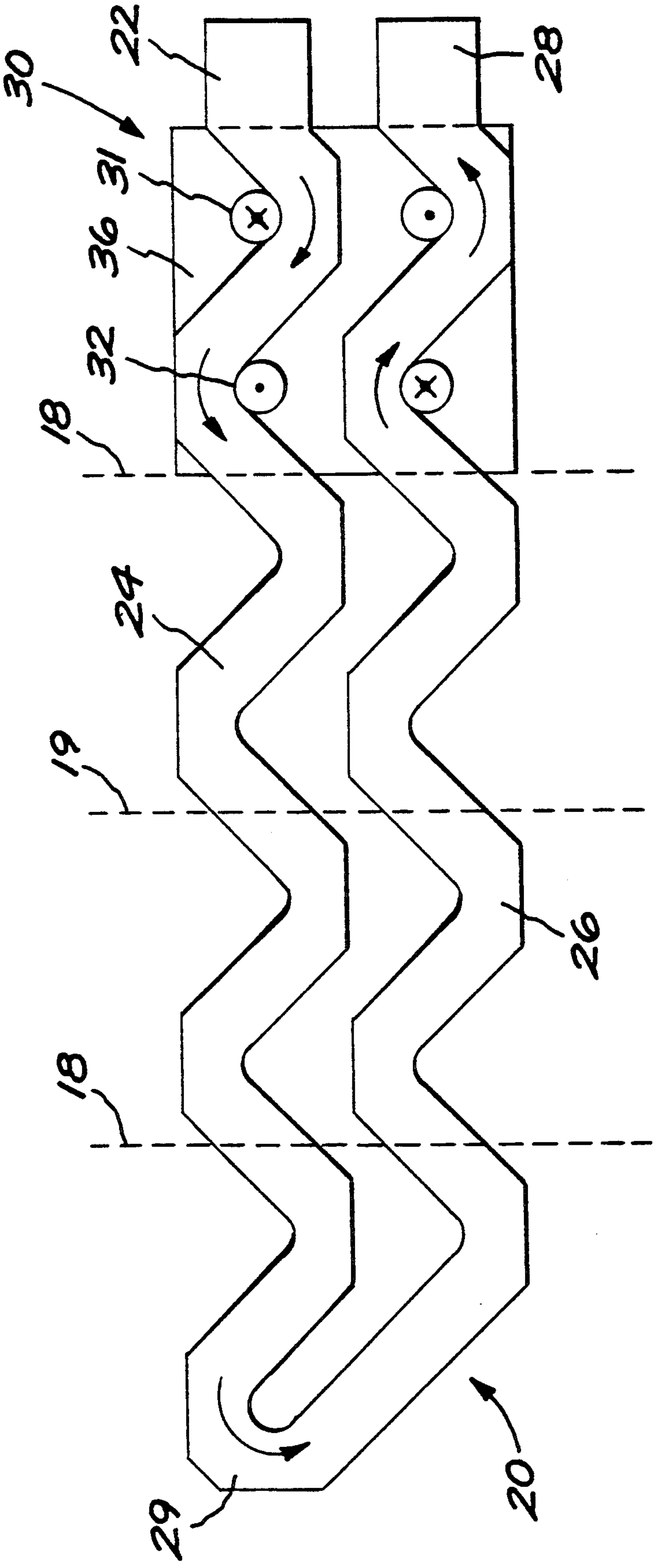
FIG. 2 is a plan view illustration of the configuration of the primary winding of the FIG. 1 transformer in its planar configuration prior to folding.

The primary winding 20 in FIG. 2 is folded to provide the winding illustrated in FIG. 1 by pulling the fold lines 19 upward out of the plane of the paper while pushing the fold lines 18 downward below the plane of the paper in order to provide a four layer accordion stack in which the winding terminals 22 and 28 are at the bottom of the stack and the closed, turn-back end 29 of the winding is at the top of the stack. Also illustrated in FIG. 2 is the lower member 36 of a ferrite core 30 along with the four posts 31-34 of that core which coincide with the magnetic poles provided by the folded primary winding 20. This portion of the ferrite core is illustrated at the bottom of the FIG. 1 illustration, while the top cover 38 of the core is illustrated at the top of the FIG. 1 illustration. In FIG. 1, the alignment of the top cover 38 of the ferrite core with the posts 31-34 of the core bottom 36 is illustrated by dashed circles 31-34 and the flow lines 31*f*-33*f*. An X is disposed within each of the dashed circles 31 and 33, while a dot is disposed within each of the dashed circles 32 and 34. As is well known n the magnetic component art, the X is used to indicate a location at which the magnetic flux extends downward into the plane of the structure, while the dot is used to indicate a location where the magnetic flux is oriented upward out of the plane of the structure. Thus, in the FIG. 1 illustration, half of the posts are disposed at magnetic poles where the flux extends downward through the structure and the other half are disposed where the flux extends upward through the structure and like poles are diagonally opposite In this configuration, the magnetic structure provides a closed magnetic path without need for exterior walls on the magnetic core. However, exterior walls may be provided, if desired.

Figure 3:
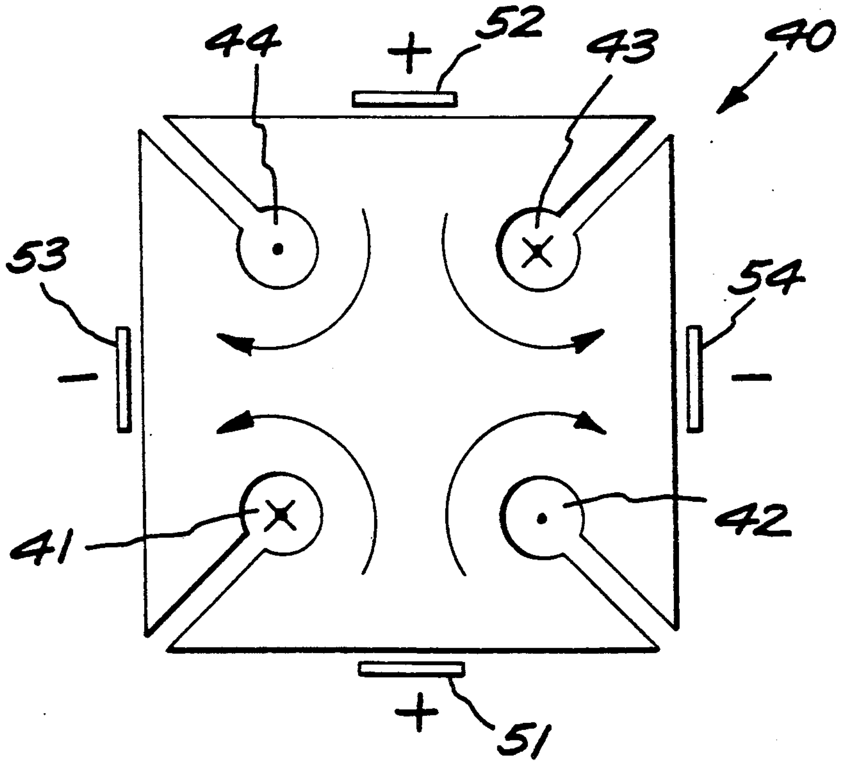
FIG. 3 is a plan view illustration of a secondary winding conductive film of the FIG. 1 transformer.

In FIGS. 2 and 3, the locations of the four magnetic poles are indicated at the dot or X in the posts 31-34 of FIG. 2 and the centers of the gaps 41-44 in FIG. 3.

In the FIG. 1 schematic, exploded view, each of the fold lines 18 and 19 is illustrated as a vertically-extending, uniform-width portion of the conductor of the winding 20. It will be understood that this is for the purposes of illustration and in the actual structure, the conductor at the fold lines 18 and 19 is as illustrated in the plan view in FIG. 2. In the event that the reader has trouble visualizing the folding of this primary winding 20 from its planar configuration into the winding stack illustrated in FIG. 1 or the manner of current flow in the winding, then cutting a photocopy of FIG. 2 to form a "paper doll" having the configuration of the conductor 20 and folding that paper doll at the fold lines should aid in such visualization.

Referring now to FIG. 3, it can be seen that the secondary winding conductive film 40 has a generally square configuration and has four slits therein which extend diagonally inward from the four corners of the square to the locations of the magnetic poles of the overall structure. At each of the magnetic poles, an aperture 41-44 in the film is provided of sufficient size to admit the posts 31-34, respectively. Illustrated adjacent each of the four sides of the square are external terminals 51-54 for the secondary winding. As may be seen in FIG. 1, these four terminals comprise external conductive strips which may be affixed to the individual conductive layers 40 by solder or other appropriate means. The terminals 51-54 serve to connect the four FIG. 1 secondary conductive films 40 in parallel. As may be seen in the FIG. 3 illustration, each conductive film 40 provides a single turn about each of the four magnetic poles of the overall structure. The connection of the separate conductive films 40 in parallel reduces the resistance and increases the current carrying capacity of the secondary winding to provide substantially the same power handling capacity as the primary winding. As is discussed in the related "Conductive Film Magnetic Components" patent application, the use of solder to connect external terminals to such conductive film secondary windings can present assembly difficulties and/or raise reliability concerns, however, we have found such solder connection straightforward and reliable in this configuration.

Figure 4:
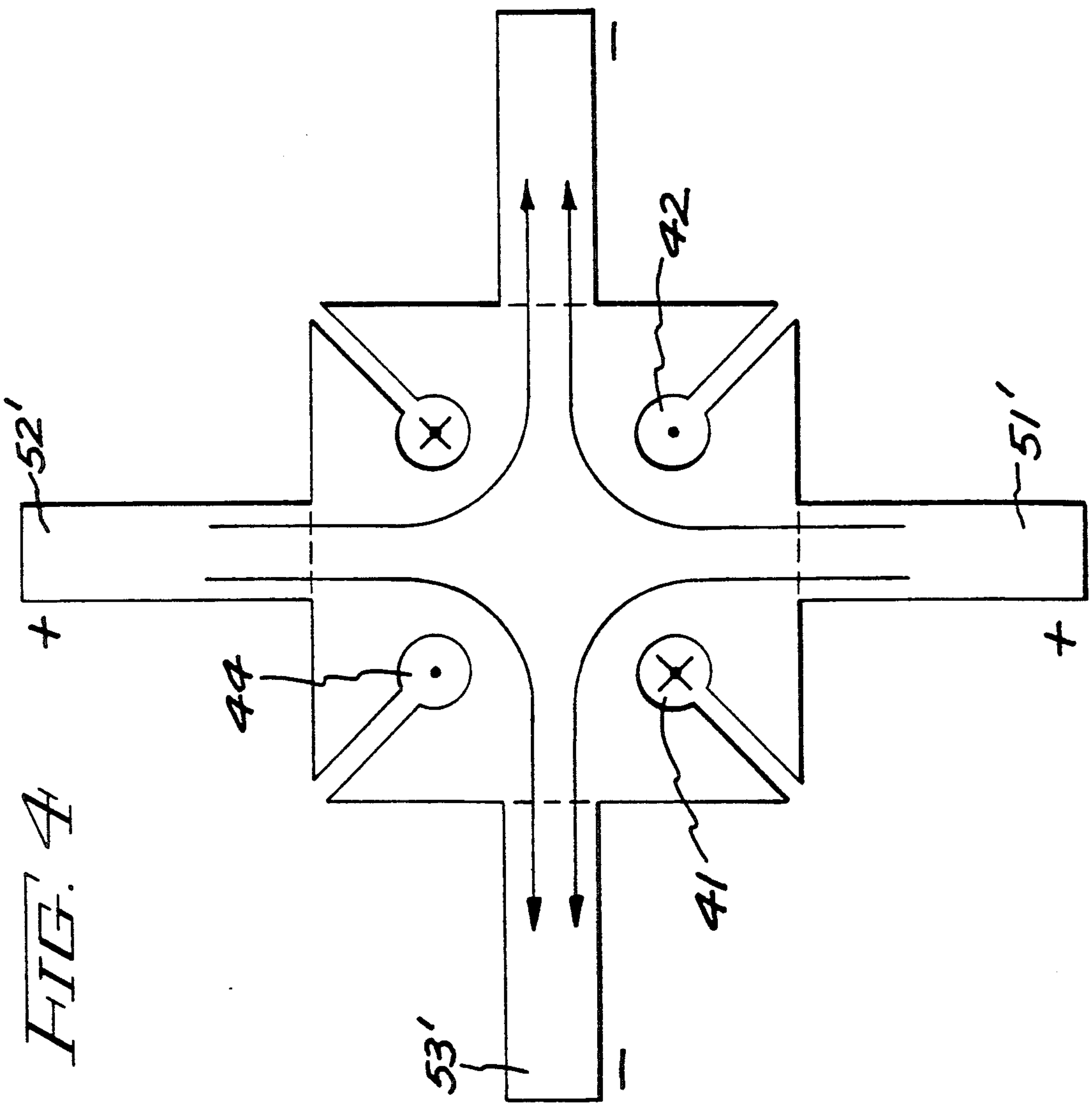
FIG. 4 is a plan view illustration of an alternative configuration for a secondary winding conductive film.
Figure 5:
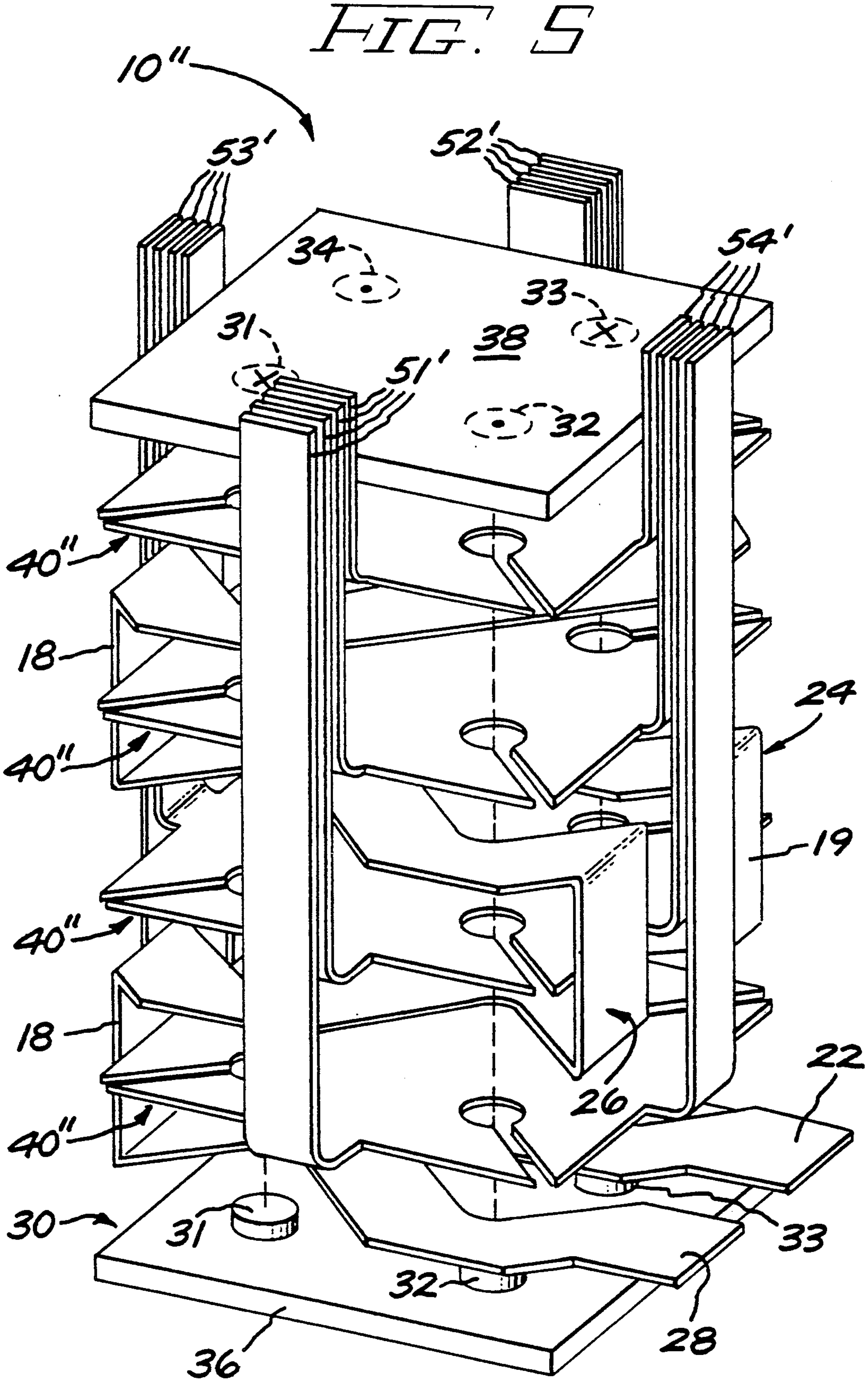
FIG. 5 is a perspective illustration like the FIG. 1 illustration, but with the secondary winding comprised of FIG. 4 type conductive films.

In FIG. 4, an alternative configuration 40' for a secondary winding conductive film is illustrated. In this configuration, integral tabs 51'-54' extend outward from the sides of the basic square of the conductive film 40'. The terminal tabs 51'-54' are integral with the main square portion of the secondary winding conductive film, thereby avoiding the necessity to provide separate individual edge connections between the conductive film 40 and the terminals 51-54 of FIG. 3. An alternative embodiment 10' of the transformer of FIG. 1 is illustrated in FIG. 5 in which the secondary winding conductive films 40 of FIG. 1 have been replaced by the secondary winding conductive film windings 40' of FIG. 4. In this embodiment, the terminal tabs of each of the conductive films 40' had been bent upward to extend above the upper cap 38 of the core 30. These conductive tabs 51'-54' preferably are free of insulating material at the location where they are connected together to form external terminals of the secondary winding.

In high frequency applications where the skin effect would limit the current carrying capacity of the four tabs if they were directly electrically connected together to less than the sum of the current carrying capacities of the four individual tabs, it is considered preferable to provide dielectric material between the adjacent tabs in order to keep them spaced apart to thereby maintain the sum of their individual current carrying capacities as the current carrying capacity of the overall structure.

In the FIG. 1 and 5 and embodiments 10 and 10' of the transformer in accordance with the present invention, external terminals of the secondary winding are provided along each of the four sides of its rectangular (square) plan view of the transformer. However, there are applications in which this positioning of the terminals of the secondary winding may be considered undesirable.

Figure 6:
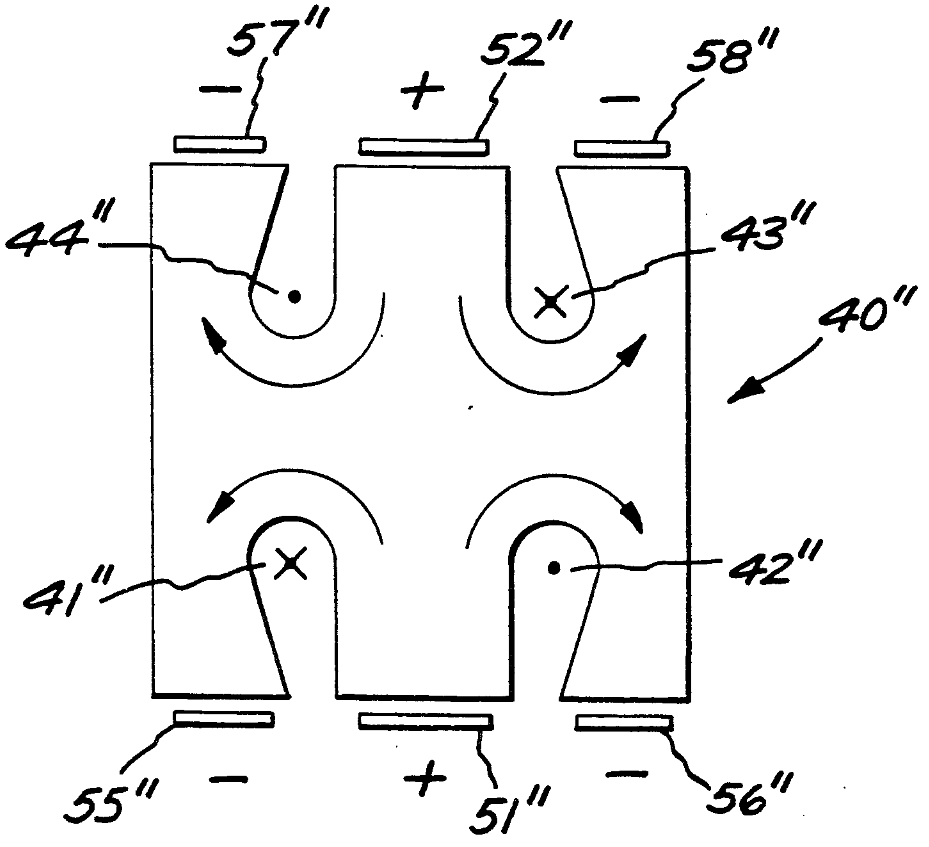
FIG. 6 is a plan view illustration of an alternative configuration for the secondary winding conductive film.
Figure 7:
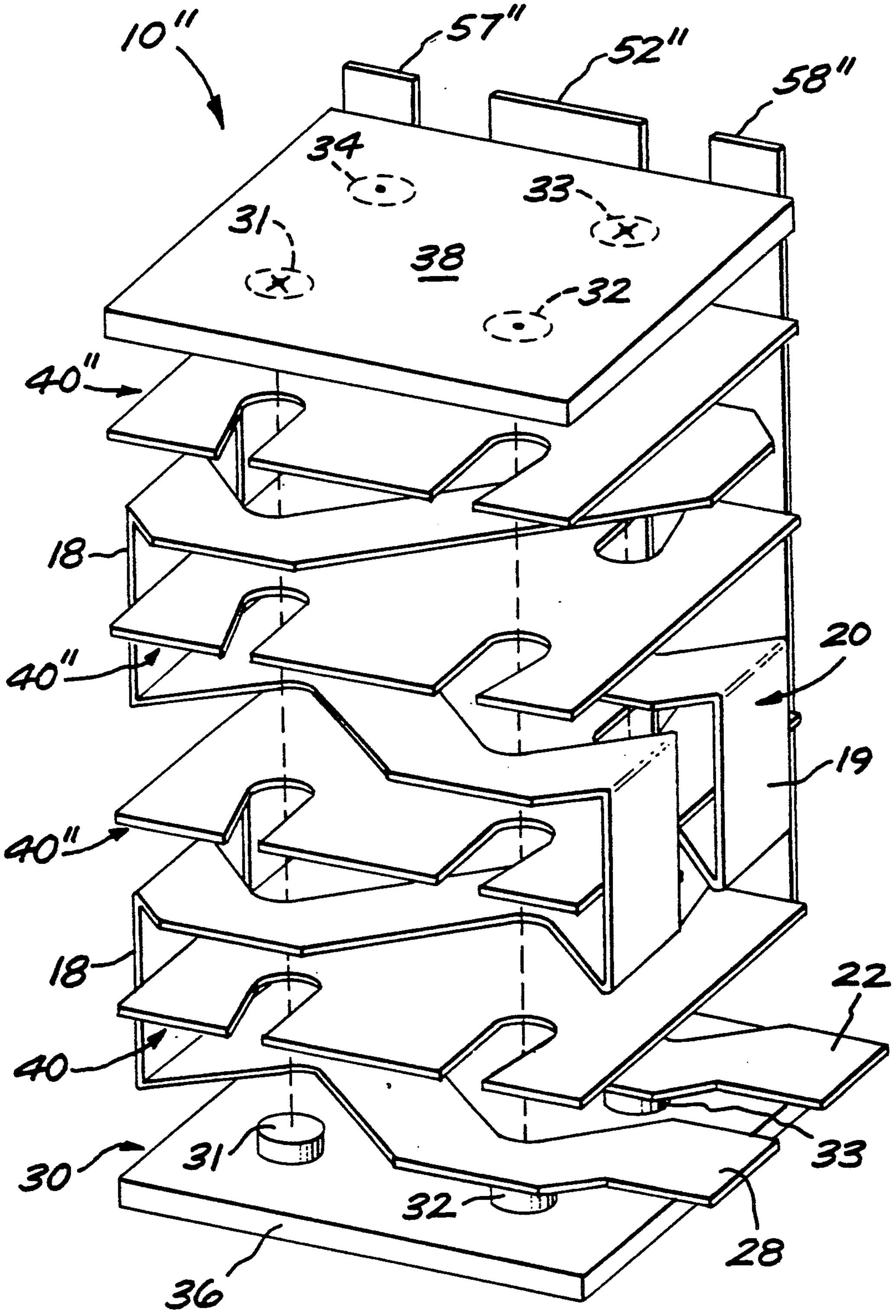
FIG. 7 is a perspective, exploded illustration of a FIG. 1 type transformer employing FIG. 6 type secondary winding conductive films.

In FIG. 6 an alternative secondary winding conductive film configuration 40" is illustrated which places all of the external terminals for the secondary winding on two opposed faces of the stack while leaving the other two opposed faces of the stack free of secondary winding terminals. Disposed adjacent the conductive film 40" in FIG. 6 are six terminal strips 51", 52" and 55"-58". It will be observed that the terminal strips 51" and 52" are twice as wide as each of the terminals 55"-58". This is because the terminals 51" and 52" carry twice the current that each of the terminals 55"-58" carries. It will be observed that each conductive film provides a full turn of of the secondary around each of the magnetic poles 41"-44" in this configuration of the film 40". A transformer 10" employing this secondary winding configuration is illustrated in perspective view in FIG. 7 with the terminal strips 51", 55" and 56" omitted from the drawing for clarity. The location of these omitted terminals in the FIG. 7 illustration will be apparent from the FIG. 6 illustration. The terminals 51", 52" and 55"-58" may be soldered to each of the conductive films 40" in the FIG. 7 illustration.

Figure 8:
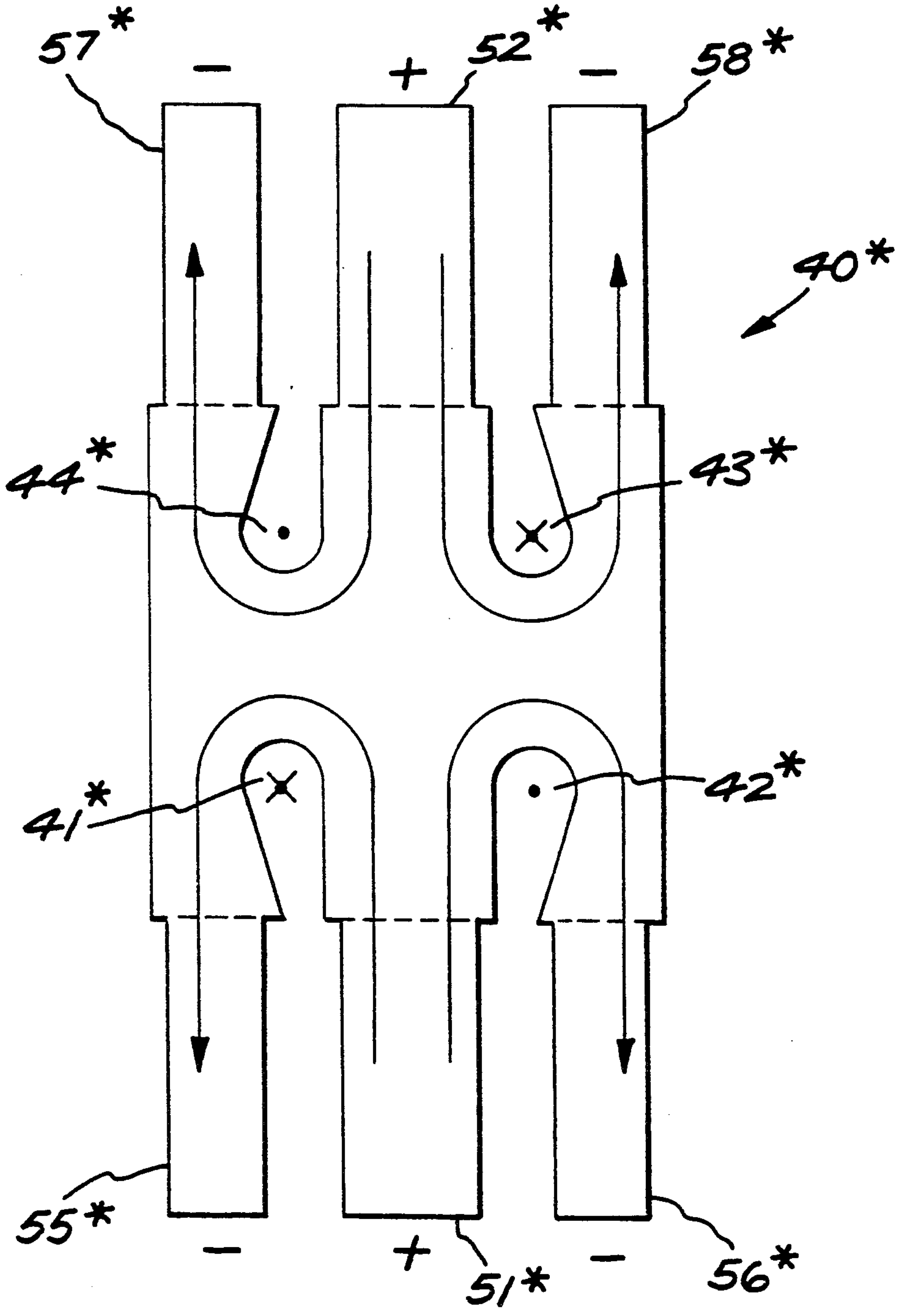
FIG. 8 is a plan view illustration of an alternative configuration of the FIG. 6 secondary winding conductive film.

In FIG. 8, an alternative configuration 10* for the conductive film 40" is illustrated in plan view. The configuration of the film 40* relates to the configuration of the film 40" in the same manner as the configuration of the film 40' relates to the configuration of the film 40. In particular, an external terminal tab extension is provided on the film 40* at the location of each of the terminals of the secondary winding. These terminal tab extension are identified by the reference numerals 51*, 52* and 55*-58*. Here again, a full turn of the secondary winding is provided about each of the magnetic poles 41*-44*.

Figure 9:
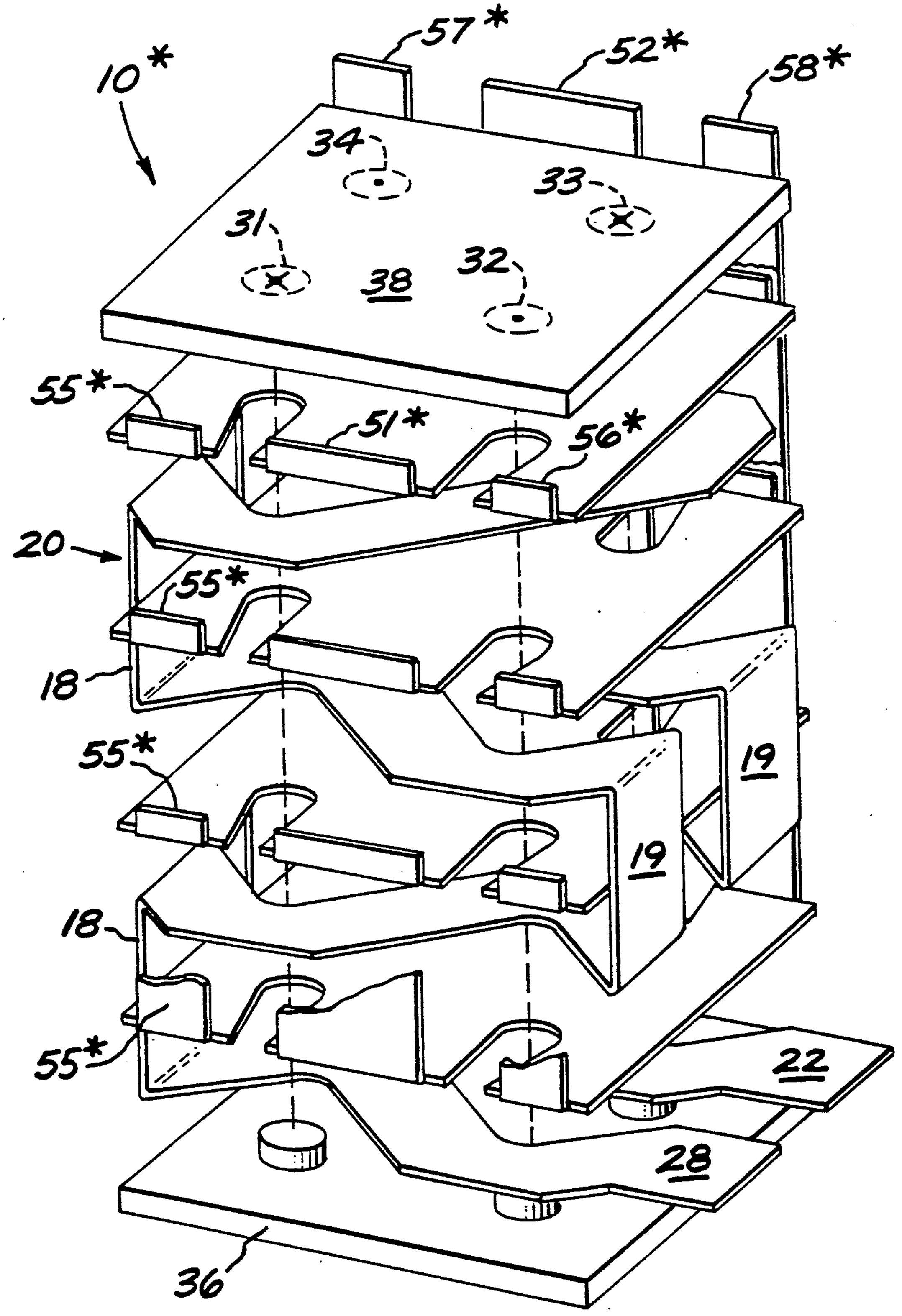
FIG. 9 is a perspective illustration of a FIG. 7 type transformer employing the FIG. 8 secondary winding conductive films.

A transformer 10* employing the secondary winding conductive films 40* is illustrated in perspective view in FIG. 9. In FIG. 9, the conductive terminal tabs 51*, 55* and 56* on the lowermost film 40* has been cut away in order to more clearly illustrate the internal structure of the transformer 10* while the terminal tab extensions 52*, 57* and 58* on that lowermost film 40* are shown in full. The terminal tabs 51*, 52* and 55*-58* on the other conductive films 40* are cut short and bent upward to provide an increased solder area for soldering external terminal strips thereto. As shown most clearly at the back of FIG. 9, the terminal tabs 51*, 52*, 55*-58* of the lowermost film 40* serve as those external strips. If appropriate for terminal tab current handling needs, the lowermost film 40* may be thicker than the other films 40* in the transformer 10*. Alternatively, the terminal tabs on the lowermost film could also be cut short and separate external terminal strips similar to those in FIGS. 6 and 7 could be used.

Figure 10:
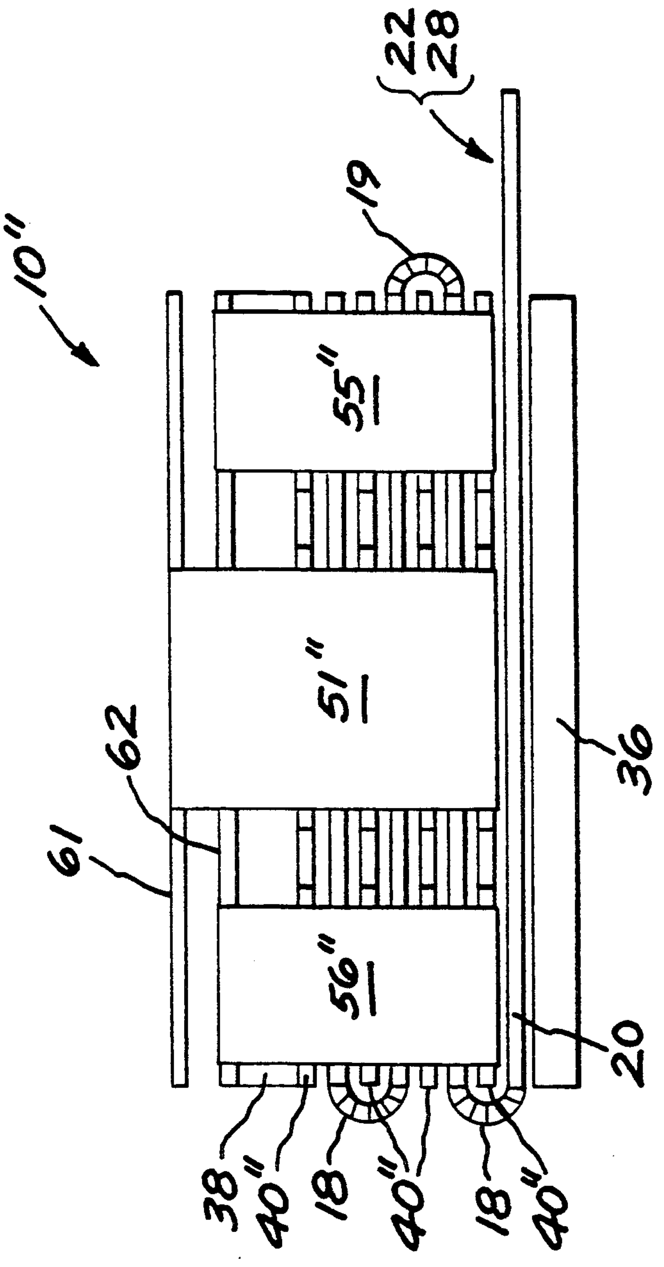
FIG. 10 is an elevation view of the FIG. 7 transformer in its assembled condition.

In FIG. 10, the transformer 10" is illustrated in elevation view which shows the relationship between the lower cap 36 and the upper cap 38 of the ferrite core 30, the primary winding 20 and the secondary windings 40" along with the external terminals 51", 55" and 56". The terminal 51" is connected to a top terminal 61 which is disposed parallel to the major surface of the ferrite cap 38 while the terminals 55" and 56" are connected to a corresponding flat terminal 62 which is also disposed parallel to the major surface of the cap 38. The terminals 61 and 62 may comprise parts of a circuit board and may serve as ground and power planes, if desired, or may be suitably patterned for attachment of semiconductor chips and other components to the terminal areas.

Figure 11:
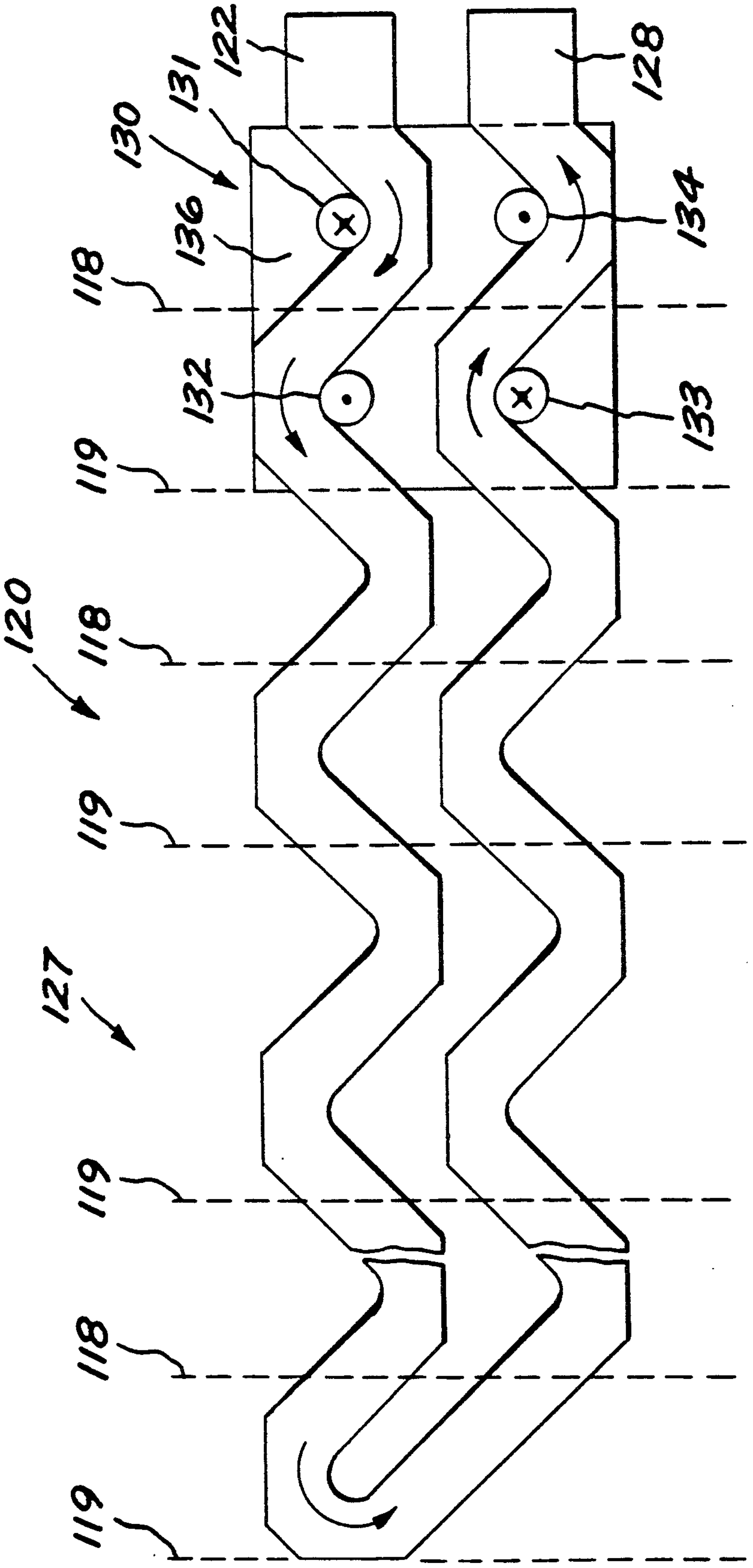
FIG. 11 is a plan view illustration of the primary winding of the FIG. 1 transformer indicated for folding into a multiple stack configuration.
Figure 12:
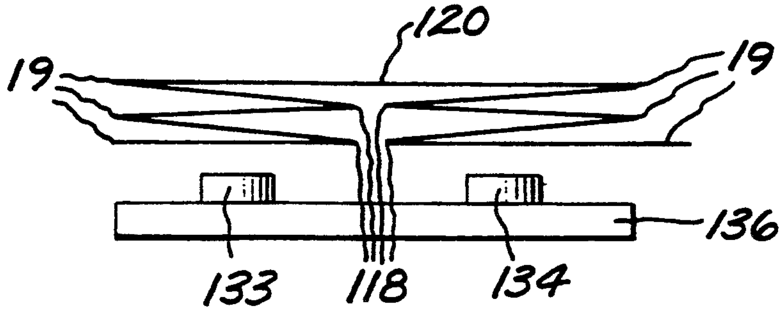
FIG. 12 is a side view of the winding of FIG. 11 in its folded configuration.

It will be noted that in each of the transformer structures discussed thus far, the primary winding is folded to form a single stack. An alternative manner of folding the primary winding of FIG. 2 is indicated in the plan view of a winding configuration 120 in FIG. 11. This primary winding configuration is indicated by the position of the fold lines 118 and 119 to be folded to provide two parallel stacks of layers which are interconnected by the wide (foldless) portion 127 of the winding. Once again, the bottom 136 of the ferrite core 130 is illustrated in plan view along with the four posts 131-134 of that core. It will be noted that in this configuration, as shown in side view in FIG. 12, the winding is folded upward to the top on posts 131 and 134 only, across to posts 132 and 133 and then downward to the bottom on the posts 132 and 133. With this winding configuration the current completes its turns around one pair of the poles before going on to another pair of the poles. This contrasts with the situation with the winding 20 in FIG. 1 where the current flows around the various poles in succession so that it completes a turn around each of the poles before beginning a second turn around any of the poles. However, winding configuration 120 can have the disadvantage of being bulkier than the FIG. 1 design because of the added space required for the extra folds. As seen in FIG. 12, the inside folds 118 of winding 120 prevent insertion of secondary winding conductive films 140 between some adjacent pairs of the primary winding layers.

Figure 13:
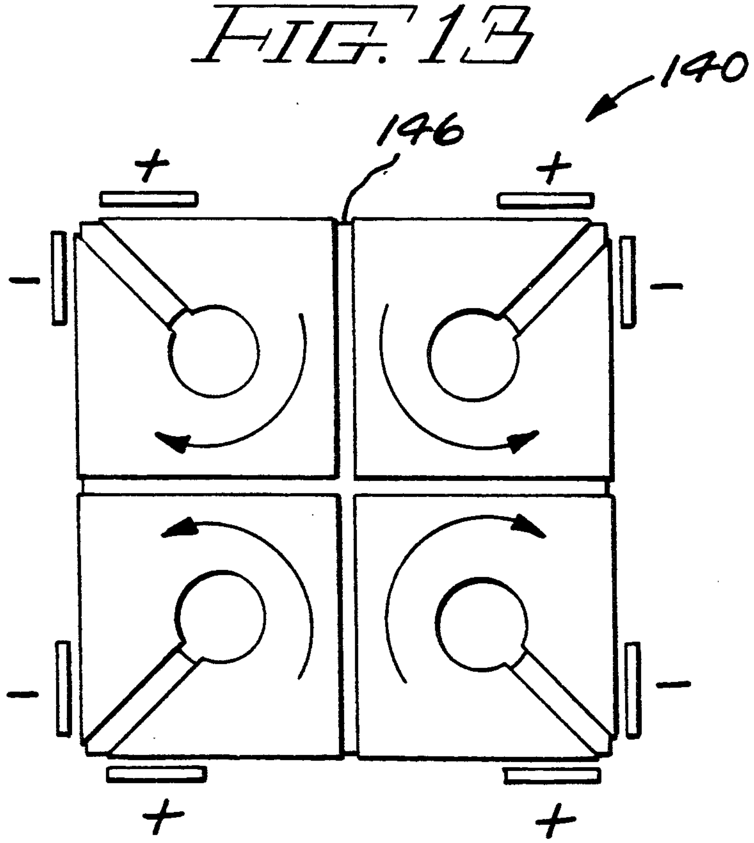
FIG. 13 is a plan view illustration of a secondary winding conductive film configuration suitable for use with the primary winding of FIG. 11.

A secondary winding conductive film configuration which is suitable for use with the primary winding 120 is illustrated at 140 in FIG. 13. As can be seen, this film 140 comprises four separate films disposed on a pair of dielectric membranes 146 to facilitate insertion of these secondary windings between each pair of adjacent layers of the primary winding. Secondary windings 40, 40', 40" and 40* may also be used with this primary winding configuration if they are omitted where the primary winding folds block their insertion.

Figure 14:
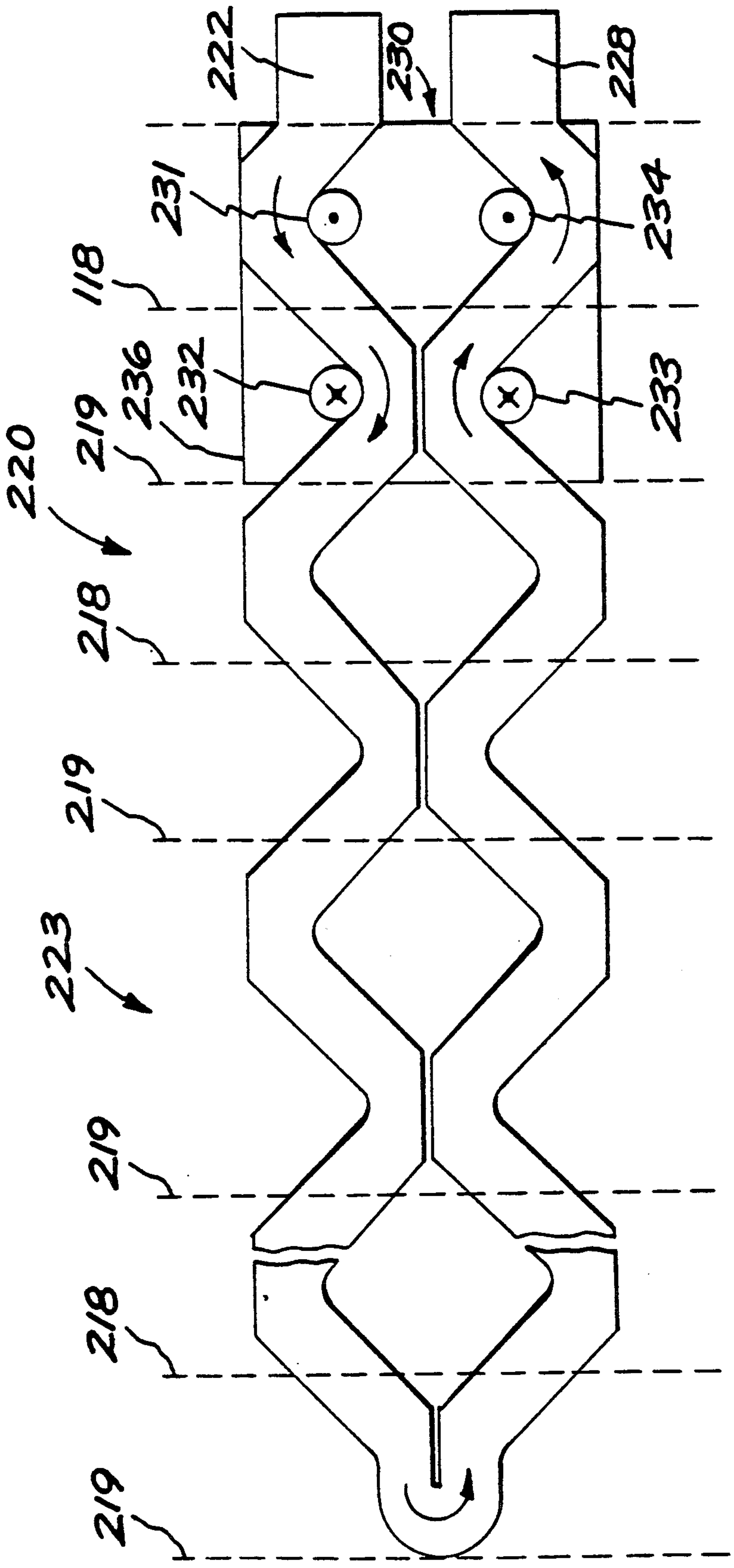
FIG. 14 is a plan view illustration of an alternative configuration for the FIG. 1 or 11 primary winding.

In FIG. 14, a further alternative configuration 220 for the primary winding is illustrated in plan view. This primary winding may be folded like the primary winding 20 of FIG. 2 to form a single stack, but is illustrated as being folded like the primary winding 120 to provide two stacks which are interconnected across their tops by the wide (foldless) portion 227 of the primary winding where no fold line is indicated. However, as will be noted from the notation on the four poles 231–234 of the magnetic core base 236, the relative positions of the different polarity poles has changed, with like poles being directly adjacent rather than diagonally opposite. A secondary winding conductive film configuration of the type shown in FIGS. 3, 4 or 13 may be used with this primary winding configuration.

Figure 15:
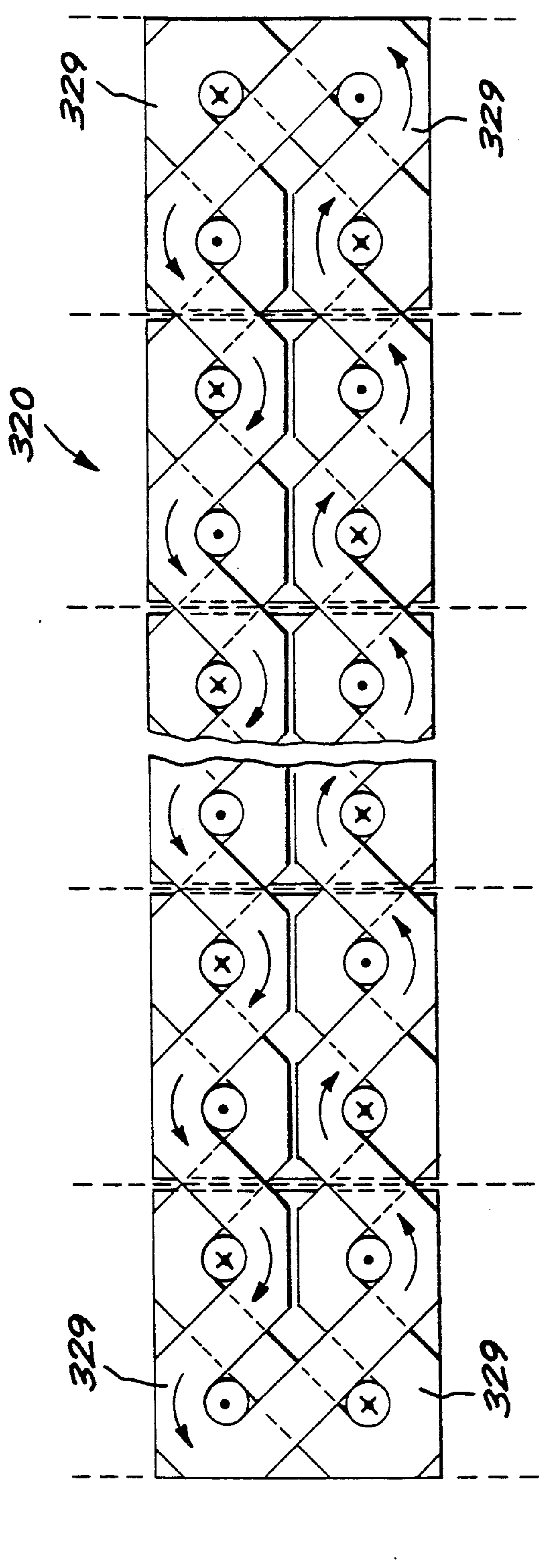
FIG. 15 is a plan view illustration of a double-sided primary winding conductive film configuration of the FIG. 1 or 11 type.

In each of the illustrations of a primary winding, only a single conductive film is illustrated. It will be understood that by providing the primary winding as a copper or other conductor laminated to both sides of a dielectric membrane such as Kapton, a two-sided winding may be provided in the manner illustrated and discussed more fully in related patent application "Conductive Film Magnetic Components". That doubles the number of primary winding turns per layer of the dielectric material. This is particularly beneficial where a high turns ratio is desired. Such a winding configuration (320) is shown in plan view in FIG. 15. This winding is patterned with a closed turn-back end 329 at each end of each of the two conductive films. As a result, as fabricated a single continuous film is provided on each side of the central dielectric membrane. A winding of a desired number of turns is cut from this pattern by counting along the pattern the desired number of turns and cutting the pattern to provide the external terminals at the cut end. This provides a double-sided winding in accordance with this invention.

While the specific embodiments described each provide four magnetic poles, it should be understood that the basic primary winding configuration illustrated in FIG. 2 may be used to provide any desired even number of poles. Where only two poles are desired, the winding is folded at each of the illustrated fold lines in FIG. 11 and at the omitted fold line in the middle of portion 127 to form a single two pole stack with the result that only the posts 31 and 34 are encircled by the primary winding and the left-hand half of the magnetic core 30 is omitted as shown in side view in FIG. 16.

If six poles are desired in a single stack, then the winding is folded after every third pair of poles to provide a single six-pole stack as shown in side view in FIG. 17.

FIG. 18 illustrates, in side view, the winding 220 folded to provide six poles in three stacks, rather than in a single stack.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a magnetic component of the type including an elongated conductive film having first and second major surfaces, said film having a generally serpentine configuration when said first major surface is disposed in a plane and in which said film is folded upon itself to form a stack of a plurality of layers which provide a winding which includes at least one turn about a magnetic pole, the improvement comprising:
  said conductive film configured and folded to provide a plurality of pairs of spaced apart magnetic poles, each of which is encircled by current flowing lengthwise in said film, the current in adjacent poles flowing in opposite directions, said conductive film further being configured and folded so that substantially the same flux weaves through each of said magnetic poles in a series fashion, said conductive film still further being configured and folded to have winding turn connections integral therewith, thereby avoiding the use of vias.

2. The improvement recited in claim 1 wherein:
  said conductive film is bonded to a dielectric membrane.

3. The improvement recited in claim 2 wherein:
  said conductive film is bonded to both sides of said membrane and configured to provide a full winding turn about each pole on each fold of said membrane.

4. The improvement recited in claim 1 wherein:
  half of said poles are of one polarity and the other half of said poles are of the opposite polarity.

5. The improvement recited in claim 1 wherein:
  said winding creates four magnetic poles.

6. The improvement recited in claim 1 wherein:
  said conductive film is folded to form a plurality of stacks.

7. The improvement recited in claim 6 wherein:
  half of said poles are of one polarity and the other half of said poles are of the opposite polarity.

8. The improvement recited in claim 6 wherein:
  said winding creates four magnetic poles.

9. The improvement recited in claim 1 wherein said magnetic component further includes:
  a second winding comprising a second conductive film;
  said second conductive film being disposed in said stack, said second conductive film being configured to provide an equal plurality of spaced apart magnetic poles coincident with the first recited plurality of magnetic poles.

10. The improvement recited in claim 9 wherein:
  said second conductive film includes a terminal extension which extends beyond the edge of said stack.

11. The improvement recited in claim 10 wherein:
  said terminal extension of said second conductive films is disposed along the side of said stack.

12. The improvement recited in claim 1 wherein said magnetic component further includes:
  a second winding comprising a plurality of separate, second conductive films;
  said second conductive films being interleaved with said layers of the first recited film in said stack, said second conductive films being configured to provide an equal plurality of spaced apart magnetic poles coincident with the first recited plurality of magnetic poles.

13. The improvement recited in claim 12 further comprising:
  terminal means electrically connecting corresponding portions of different ones of said second conductive films to form a secondary winding comprising a plurality of said second conductive films connected in parallel.

14. The improvement recited in claim 13 wherein: said terminal means comprise extensions of said second conductive films beyond the edges of said stack.

15. The improvement recited in claim 14 wherein: said terminal extensions of said second conductive films are disposed along the sides of said stack.

16. The improvement recited in claim 14 wherein: corresponding ones of said terminal extensions are bonded together, as an external terminal of said winding.

17. The improvement recited in claim 1 wherein said component further includes:

a plurality of second conductive films;

said second conductive films being interleaved with said layers of the first recited film in said stack, said second conductive films being configured to provide an equal plurality of spaced apart magnetic poles coincident with the first recited, plurality of magnetic poles.

18. The improvement recited in claim 17 wherein said component further comprises:

terminal means selectively connecting said second conductive films to form a secondary winding comprising a plurality of said second conductive films connected in parallel.

19. The improvement recited in claim 18 wherein: said terminal means comprise extensions of said second conductive films beyond the edges of said stack.

20. The improvement recited in claim 19 wherein: said terminal extensions of said second conductive films are disposed along the sides of said stack.

21. The improvement recited in claim 19 wherein: corresponding ones of said terminal extensions are bonded together as an external terminal of said winding.

* * * * *